United States Patent
Moy et al.

Patent Number: 5,856,935
Date of Patent: *Jan. 5, 1999

[54] FAST HADAMARD TRANSFORM WITHIN A CODE DIVISION, MULTIPLE ACCESS COMMUNICATION SYSTEM

[75] Inventors: Jeffrey H. Moy; Terry M. Schaffner, both of Palatine, Ill.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 646,595

[22] Filed: May 8, 1996

[51] Int. Cl.$^6$ .......................................... G06F 7/36
[52] U.S. Cl. .......................................... 364/727.01
[58] Field of Search ..................... 364/727, 725, 364/727.01, 725.01; 348/403

[56] References Cited

U.S. PATENT DOCUMENTS

| | | | |
|---|---|---|---|
| 4,446,530 | 5/1984 | Tsuboka | 364/727.01 |
| 4,463,377 | 7/1984 | Meyer-Ebrecht et al. | 364/727 |
| 4,621,337 | 11/1986 | Cates et al. | 364/727 |
| 5,268,853 | 12/1993 | Tanaka et al. | 364/725 |
| 5,357,454 | 10/1994 | Dent | 364/727 |
| 5,574,675 | 11/1996 | Lin | 364/727 |
| 5,619,270 | 4/1997 | Demmer | 364/727.01 |
| 5,726,925 | 3/1998 | Hyun et al. | 364/727.01 |

OTHER PUBLICATIONS

"Adaptive & Digital Signal Processing", pp. 158—166, Claude S. Lindquist, 1989.

Near Maximum Likelihood Demodultion for M–ary Orthogonal Signalling, pp. 5–8, Rod Walton and Mark Wallace, GTE Laboratories Inc., 40 Sylvan Road, Waltham, MA 02254, USA, 1994.

*Primary Examiner*—Tan V. Mai
*Attorney, Agent, or Firm*—Kenneth A. Haas

[57] ABSTRACT

In a receiver (10) of a code division multiple access system, a method of processing a received signal including reading a first and second data item from a first memory (50), at least one of the first and second data items associated with Walsh data; performing a first arithmetic operation on the first and second data items to produce a first result; performing a second arithmetic operation on the first and second data items to produce a second result; and storing the first and second result into a second memory (52) while reading a third and fourth data item from the first memory (50).

5 Claims, 1 Drawing Sheet

FAST HADAMARD TRANSFORM WITHIN A CODE DIVISION, MULTIPLE ACCESS COMMUNICATION SYSTEM

FIELD OF THE INVENTION

The present invention relates generally to communication systems, and more particularly to a method and apparatus for processing a received signal in a receiver of code division multiple access system.

BACKGROUND OF THE INVENTION

Within a receiver of a wireless communication system, such as a code division multiple access (CDMA) system, many complex processing tasks are performed. An example of such a processing task is a fast hadamard transform (FHT), which may be performed by an integrated circuit or a digital signal processor. Due to power dissipation considerations and a limited number of available clock cycles, it is desirable to improve the performance of any FHT implementation by increasing the processing speed and reducing the amount of power consumed. In addition, in an application specific integrated circuit (ASIC), a premium is placed on the number of gates used. Thus, it is desirable to reduce the number of gates used by an integrated circuit device performing the FHT function.

Accordingly, there exists a need for a method and apparatus for FHT processing with increased speed, reduced power, and a reduced number of gates.

SUMMARY OF THE INVENTION

In order to address this need, an aspect of the present invention provides, in a receiver of a code division multiple access system, a method of processing a received signal. The method includes the steps of reading a first and second data item from a first memory, at least one of the first and second data items associated with Walsh data; performing a first arithmetic operation on the first and second data items to produce a first result; performing a second arithmetic operation on the first and second data items to produce a second result; and storing the first and second result into a second memory while reading a third and fourth data item from the first memory.

In accordance with a further aspect of the invention in a receiver of a code division multiple access system, another method of processing a received signal is provided. This method includes reading a first data item from a first portion of a memory; reading a second data item from a second portion of the memory, at least one of the first and second data items associated with Walsh data; performing a first arithmetic operation on the first and second data items to produce a first result; performing a second arithmetic operation on the first and second data items to produce a second result; and storing the first result into the first portion of the memory and storing the second result into the second portion of the memory while reading a third data item from the memory.

In accordance with a further aspect of the invention in a receiver of a code division multiple access system, another method of processing a received signal is provided. This method includes reading a first data item from a first portion of a memory; reading a second data item from a second portion of the memory, at least one of the first and second data items associated with a Walsh chip; performing a first arithmetic operation on the first and second data items to produce a first result; performing a second arithmetic operation on the first and second data items to produce a second result; and storing the first result into the first portion of the memory and storing the second result into the second portion of the memory while reading a third data item from the memory.

In accordance with another aspect of the invention, an apparatus for processing a received signal in a code division multiple access system is provided. The apparatus includes a first latch, a second latch, a first arithmetic operation device, a second arithmetic operation device, a first memory, a second memory, and a selection device. The first latch stores a first data item derived from the received signal. The second latch stores a second data item derived from the received signal. The first arithmetic operation device is responsive to the first and second latches. The second arithmetic operation device is responsive to the first and second latches. The first and second memory are each responsive to the first and second arithmetic operation devices. The selection device is responsive to the first and second memory and in communication with the first and second latches.

The invention itself, together with its attendant advantages, may best be understood by reference to the following detailed description, taken in conjunction with the accompanying drawings.

DETAILED DESCRIPTION OF THE PREFERRED EMBODIMENT(S)

Figure 1:
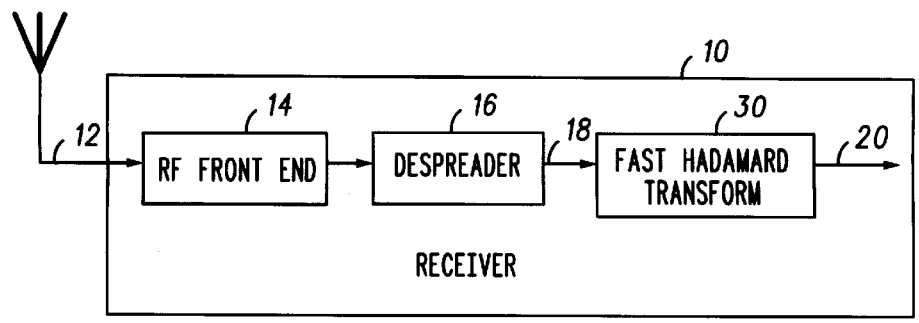
FIG. 1 is a block diagram of a portion of a receiver in a code division multiple access system.

Referring to FIG. 1, a portion of a receiver 10, preferably a code division multiple access (CDMA) receiver, is illustrated. The receiver 10 includes an antenna 12, radio frequency (RF) front end circuitry 14, a despreader 16, and a fast hadamard transform (FHT) module 30. The RF front end 14 and the despreader 16 are conventional units known to those skilled in the art. The FHT 30 is constructed according to an embodiment of the present invention. FHT 30 receives despread data 18, such as Walsh chip data, from despreader 16 and outputs Walsh domain data 20. During operation, a received signal is detected at antenna 12, processed by RF front end circuitry 14, such processing including downconversion and filtering operations known to those of ordinary skill, and despread by despreader 16. The despreading operation is performed where the received signal is a spread spectrum signal such as those used in CDMA wireless communication systems. A typical CDMA wireless communication system is described in the Telecommunication Industry Association (TIA)/Electronics Industry Association (EIA) Interim Standard (IS) IS-95, available from TIA, Washington D.C., published 1993. The despreader 16 outputs despread data, such as Walsh chips that are uncorrelated. FHT 30 receives the Walsh chips and processes the Walsh chip input data to produce correlated Walsh domain data 20. The Walsh domain data 20 is then processed further by the receiver 10 in a conventional manner to recover information carried by the received signal. Although only a single receive path through the receiver 10 has been described, multiple receive paths, such as in a RAKE multiple receive path type of receiver, may also be used.

Figure 2:
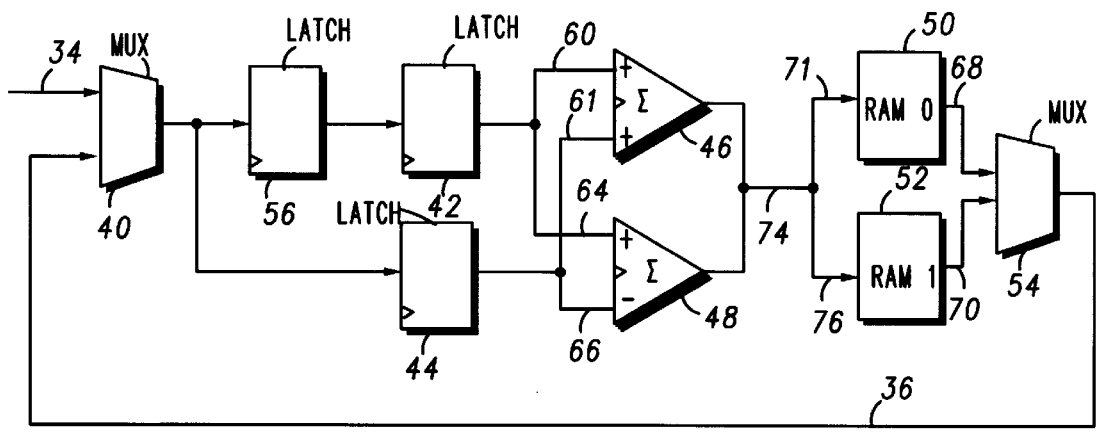
FIG. 2 is a block diagram of a first embodiment of the FHT module of FIG. 1.

Referring to FIG. 2, a first embodiment of the FHT 30 is illustrated. The FHT 30 includes a first multiplexor (MUX) 40, a first latch 42, a second latch 44, a third latch 56, a first arithmetic operation device, such as summer 46, a second arithmetic operation device, such as subtractor 48, a first memory 50, a second memory 52, and a second MUX 54. The first MUX 40 receives input data 34 and is coupled to the second latch 44 and the third latch 56 which is coupled to the first latch 42. The first latch 42 is coupled to a first input 60 of the summer 46 and to a first input 64 of the subtractor 48. The second latch 44 is coupled to a second input 62 of the summer 46 and to a second input 66 of the subtractor 48. The summer 46 is coupled to the first memory 50 via data line 72 and is coupled to the second memory 52 via data lines 74 and 76. Similarly, subtractor 48 is coupled to the second memory 52 via line 74 and is coupled to the first memory 50 via lines 72 and 76. The first memory 50 is coupled to the second MUX 54 via line 68 and the second memory 52 is coupled to the second MUX 54 via line 70. The second MUX 54 is coupled to the first MUX 40 via a feedback line 36 and produces output data 32. Each of the MUXs 40, 54 is an example of a selection device. In the particular embodiment of FIG. 2, the FHT is implemented as a synchronous circuit where each component is connected to a common clock, such as a clock operating at about 40 MHz. The latches 42, 44, 56 are preferably D flip flops. The summer 46 and the subtractor 48 are preferably implemented as an 8 bit input carry look ahead type of adder/subtractor with an 8 bit output (after rounding and discarding the least significant bit). In addition, various testing circuits (not shown), such as conventional scanning circuits connecting the latches 42, 44, 56 or verifying the integrity of the memory 50, 52 may be attached to the FHT 30 to improve reliability and robustness of the design.

During operation, selected input data 34, such as Walsh data, in a particular illustrative embodiment the Walsh data is Walsh chips derived from a received signal detected by receiver 10, is received at MUX 40 and is passed to the first latch 42, via the third latch 56, and is also passed to the second latch 44. In a first stage of operation for a particular embodiment, the first latch 42 stores a first data item N from the input data 34 and the second latch 44 stores a second data item N+32 from the input data 34. The first data item N is associated with a Walsh chip that is preferably one of a limited set, typically a set of 64 in a CDMA system, of Walsh chips, 64 Walsh chips forming a Walsh symbol. Similarly, data item N+32 is associated with a second Walsh chip in the set of Walsh chips and is offset from data item N by 32 Walsh chip positions in input data 34. The output from the first and second latches 42, 44 is added by summer 46 and stored in the first memory 50, preferably in memory location 2N. The output from the second latch 44 is subtracted by subtractor 48 from the output of the first latch 42 and the result is stored in the first memory 50, preferably at memory location 2N+1. The above steps of storing data in the latches 42, 44, summing in summer 46, subtracting in subtractor 48, and storing results in the first memory 50 are repeated for a set of input data 32, such as for the entire set of orthogonal Walsh chips derived from a received spread spectrum signal. In a particular embodiment using a 64 point FHT, N varies from 0 to 31 to cover all 64 Walsh chips.

During a second stage of operation, data items N and N+32 from memory locations N and N+32 are read from the first memory 50. The data items are then fed back via feedback line 36 and stored in the latches 42 and 44. Data item N from memory location N is stored in latch 42 and data item N+32 from memory location N+32 is stored in latch 44. The data items N and N+32 from latches 42 and 44 are added by summer 46 and subtracted by subtractor 48 and the results are stored in the second memory 52, preferably in memory locations 2N and 2N+1 respectively. The above steps are repeated for the rest of the data stored in the first memory 50 during the first stage of operation, such as by incrementing N from 0 to 31 in a 64 point FHT process.

During a third stage of operation, data items N and N+32 is read from the second memory 52. The data from memory 52 is then latched, added by summer 46 (a first arithmetic operation producing a first result), subtracted by subtractor 48 (a second arithmetic operation producing a second result), and then the first and second results are stored in the first memory 50. The above steps are repeated for a plurality of data items such as data items identified by incrementing N from 0 to 31 in the illustrative 64 point FHT example. For example, third and fourth data items identified as N+1 and N+33, such as data associated with Walsh chips number 1 and 33, may be read from the second memory 52 and arithmetically processed with the results stored in the first memory 50. It should be noted that since two memories 50 and 52 are used, it is preferred to provide increased efficiency by pipelining the above processing operations. For example, data may be read from the first memory 50 at substantially the same time that other data is being stored in the second memory 52. After performing arithmetic operations on the data from the first memory 50, the resulting data from the arithmetic operations, such as from summer 46 and subtractor 48, may be stored to the second memory 52 while further data is read from the first memory 50. It should be noted that multiple pairs of data points associated with the Walsh data may be stored in memory 50, 52 and may be processed over multiple processing clock cycles.

Processing continues during a fourth stage as described above for the second stage and during a fifth stage as described above for the third stage. During a sixth and final stage, data items N and N+32 are read from the first memory 50. Data items N and N+32 are then summed by summer 46 and output as a result M by MUX 54 at data output 32. Data item N+32 is then subtracted from data item N by subtractor 48 with a result M+1 output by MUX 54 at data output 32. The above steps of stage six are repeated for multiple data items, such as for data items N=0 to 31 to process the entire set of 64 Walsh chips.

Figure 3:
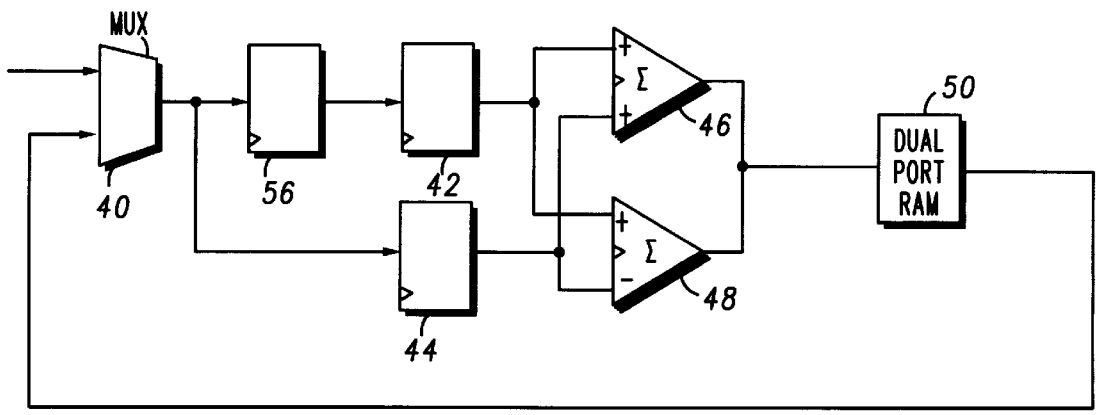
FIG. 3 is a block diagram of a second embodiment of the FHT module of FIG. 1.

In a second embodiment, a dual port memory 56, such as a dual port random access memory, may be used instead of two separate memory units 50, 52, as illustrated in FIG. 3. In this case, a first data item, such as data item N, may be read from a first portion of the dual port memory 56, a second data item, such as data item N+32, may be read from a second portion of the dual port memory 56, and a result, such as a result of an addition or subtraction operation, may be stored in the first and second portions of the dual port memory 56. The advantages gained by pipelined processing via substantially simultaneous reading and writing into memory during arithmetic operations as described for the two memory device architecture of FIG. 2 are also realized from the dual port memory embodiment of FIG. 3.

Although the FHT 30 of FIG. 2 and FIG. 3 have been described with respect to discrete circuit elements, it should be understood that an integrated circuit implementation, such as a 0.42 micron standard cell CMOS technology application specific integrated circuit (ASIC), is preferred due to its low power and reduced size. However, it is to be understood that the present invention is not limited by the particular implementation details set forth in the drawings or described above.

It should be understood that for purposes of this application, one component is responsive to or in communication with another component regardless of whether the two components are directly coupled or indirectly coupled, such as via intermediate components, including switches that operatively couple the components for only a segment of time, as long as a signal path can be found that directly or indirectly establishes a relationship between the components. For example, the first memory 50 is responsive to the first MUX 40, as defined herein, even though intermediate components, such as the first latch 42 and the adder 46, are disposed between the first MUX 40 and the first memory 50.

The above described illustrative embodiment provides many benefits. For example, the above-described FHT implementation reduces the number of clock cycles required when performing FHT calculations and has a reduced number of electronic gates. In addition, the above device uses less power and has improved efficiency compared to conventional FHT devices. These benefits are particularly important in a CDMA receiver.

Further advantages and modifications of the above described apparatus and method will readily occur to those skilled in the art. For example, although the illustrative embodiments referred to converting Walsh chip data into Walsh domain data, it is contemplated that the present invention may also be used to perform an inverse transform of Walsh domain data into Walsh chips. The invention, in its broader aspects, is therefore not limited to the specific details, representative apparatus, and illustrative examples shown and described above. Various modifications and variations can be made to the above specification without departing from the scope or spirit of the present invention, and it is intended that the present invention cover all such modifications and variations provided they come within the scope of the following claims and their equivalents.

What is claimed is:

1. An apparatus for performing a Hadamard transform on a received signal within in a code division multiple access communication system, the apparatus comprising:

at most three latches wherein a first latch and a second latch have a common input and the first latch has an output coupled to a third latch;

at most two summing circuits, wherein a first and a second summing circuit have inputs from the second and the third latch a first and a second memory device having inputs from the at most two summing circuits; and a first multiplexer having inputs from the first and the second memory devices.

2. The apparatus of claim 1 further comprising a second multiplexer having a feedback input from the first multiplexer.

3. The apparatus of claim 2 wherein the first multiplexer is responsive to data derived from the received signal.

4. The apparatus of claim 1 wherein the second memory device stores an output from one of the first and the second summing circuits while the first memory device performs a read operation.

5. The apparatus of claim 1 wherein the first summing circuit is an adder and the second summing circuit is a subtractor.

\* \* \* \* \*